No. 625,732. Patented May 30, 1899.
R. S. ANDERSON.
BACK PEDALING BRAKE.
(Application filed Jan. 29, 1897.)
(No Model.) 2 Sheets—Sheet 1.
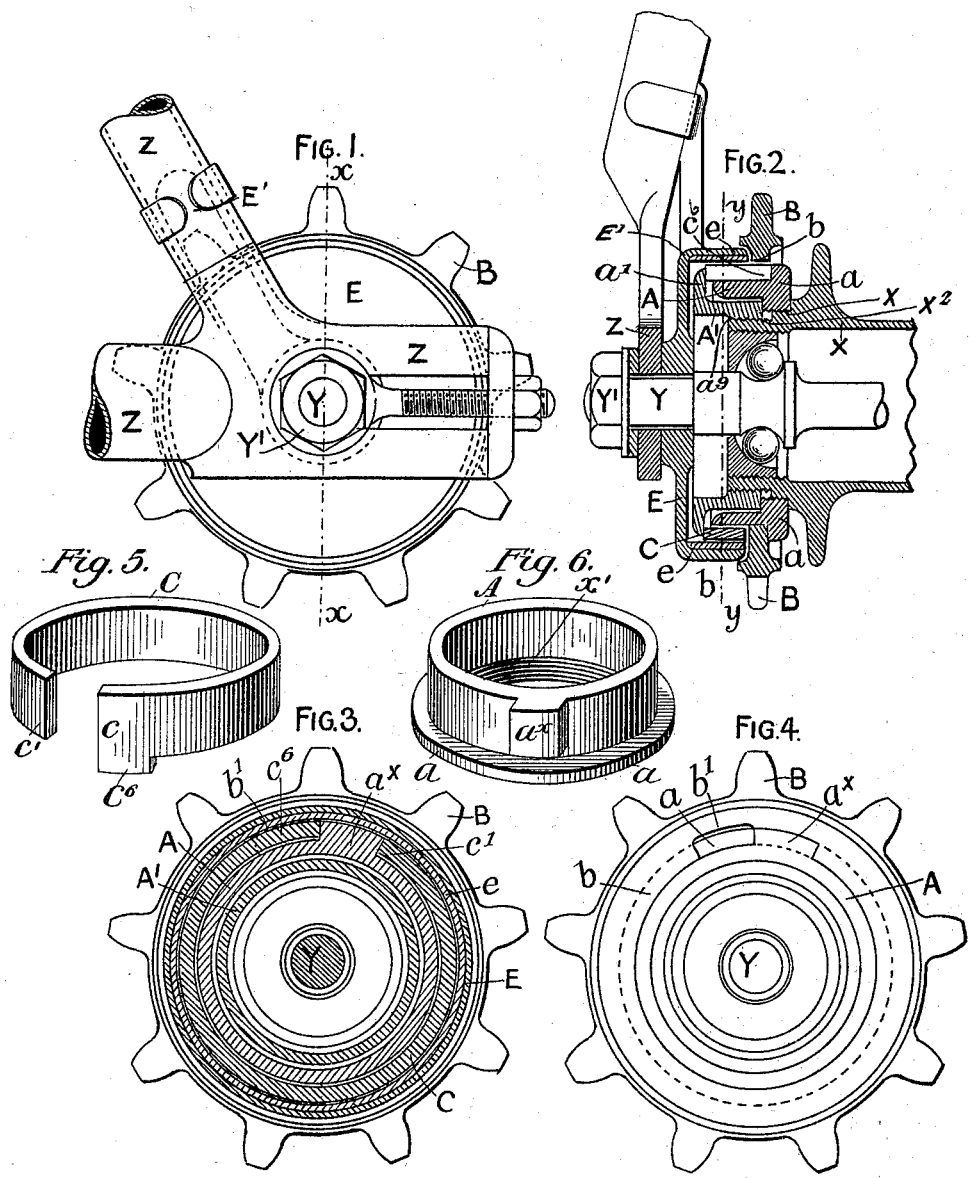
Witnesses
Inventor No. 625,732. Patented May 30, 1899.
R. S. ANDERSON.
BACK PEDALING BRAKE.
(Application filed Jan. 29, 1897.)

(No Model.) 2 Sheets—Sheet 2.

WITNESSES: INVENTOR
Gustave Dietrich. Robert Scott Anderson
John Kehlenbeck. BY
Newell + Jennings
ATTORNEYS

THE NORRIS PETERS CO., PHOTO-LITHO., WASHINGTON, D. C.

UNITED STATES PATENT OFFICE.

ROBERT S. ANDERSON, OF TORONTO, CANADA, ASSIGNOR TO THE NEW DEPARTURE BELL COMPANY, OF BRISTOL, CONNECTICUT.

BACK-PEDALING BRAKE.

SPECIFICATION forming part of Letters Patent No. 625,732, dated May 30, 1899.

Application filed January 29, 1897. Serial No. 621,151. (No model.)

*To all whom it may concern:*

Be it known that I, ROBERT SCOTT ANDERSON, a subject of Her Majesty the Queen of Great Britain and Ireland, residing at Toronto, in the county of York and Dominion of Canada, have invented certain new and useful Improvements in Brakes for Bicycles and other Vehicles, (for which Letters Patent have been obtained in Great Britain, dated November 28, 1896, No. 27,068; in France, dated January 19, 1897, No. 263,187; in Belgium, dated June 21, 1897, No. 128,987; in Italy, dated July 15, 1897, No. 88/327; in Victoria, dated October 1, 1897, No. 14,631; in New South Wales, dated October 2, 1897, No. 7,856, and in Colony of Good Hope, dated September 9, 1897, No. 1,420,) of which the following is a specification.

The present invention relates to vehicle-brakes, and more particularly to brakes for bicycles and like wheeled vehicles.

The object of the present invention is to produce a bicycle-brake of simple construction and one which shall be quick and positive in its action.

To the above end the present invention consists of the devices and combination of devices, which will be hereinafter described and claimed.

The invention is illustrated in the accompanying drawings, in which—

Figure 7:
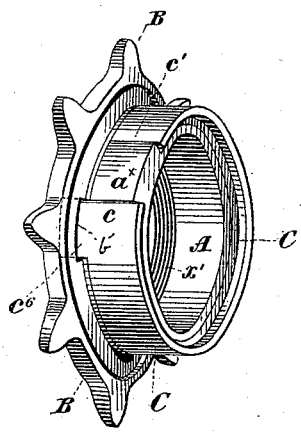
Figure 8:
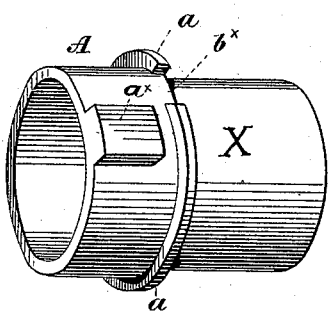

Figure 1 is a broken view in side elevation, showing the improved brake fitted to the driving or rear wheel of a safety-bicycle. Fig. 2 is a view in longitudinal section of the brake mechanism on line $x\ x$ of Fig. 1. Fig. 3 is a view in transverse section on line $y\ y$ of Fig. 2. Fig. 4 is a view in side elevation, the fixed brake member, the movable brake member, and other portions being removed. Fig. 5 is a separate detailed view of the movable brake member. Fig. 6 is a separate detailed view of a sleeve which will be hereinafter referred to. Fig. 7 is a view in perspective of the brake with the fixed brake member removed. Fig. 8 is a view in perspective of the wheel-hub and will be referred to more particularly hereinafter.

Similar letters of reference refer to similar parts throughout the following specification.

In the drawings, Z represents portions of the fixed frame or rear fork of a safety-bicycle, in suitable bearings in which is mounted an axle Y, upon which is mounted to rotate the hub X of the bicycle-wheel, all of which, except as hereinafter specified, may be of any usual or preferred form and arrangement.

In the embodiment of the present invention which I have illustrated in the drawings I have provided a movable brake member mounted upon the hub X and a fixed brake member mounted upon some fixed portion of the frame Z, and I have so connected the movable brake member, the hub, and the wheel-driving element that a relative rotary movement of the wheel-driving element and the hub, such as would be caused by retarding the rotation of the wheel-driving element in the act of back-pedaling, will cause the movable brake member to move radially toward the brake-surface of the fixed brake member and closely engage the same, thus "braking" or retarding the rotation of the hub and wheel.

In the present invention, as shown in the drawings, the movable brake member comprises a split or divided elastic ring C, which is mounted upon the hub X, its opposite ends butting or resting against a projection or lug $a^\times$, carried by said hub. One end of said elastic brake-ring C is connected with the wheel-driving element B, and both are mounted loosely upon the hub X, the arrangement being such that a movement of the wheel-driving element in one direction will force one end $c$ of the elastic brake-ring against the lug $a^\times$, carried by the hub X, to impart a forward rotation to said hub and wheel to propel the bicycle; but a retardation of the wheel-driving element B as the hub X and wheel continue to revolve under the propelling force which has been imparted to the same will retard the movable elastic brake-ring C, and the lug $a^\times$, carried by the hub, acting upon the opposite end $c'$ thereof, while the end $c$ is held by the wheel-driving element H, will act to expand said elastic brake-ring and force the same into frictional engagement with the fixed brake member E, thus tending to prevent the rotation of the hub and wheel and to bring the vehicle to a stop.

The lug $a^\times$ may be formed directly upon the hub X, if desired, as shown in Fig. 8; but for convenience in manufacturing and also for the purpose of enabling my improved brake to be applied to bicycles and other vehicles already made I have shown the lug $a^\times$ as being formed upon a sleeve which is interiorly threaded, as shown at $x'$, and screwed upon a threaded portion $x$ of the hub X, said sleeve being arranged concentrically to the hub and fixed brake member E and forming a bed or support upon which is mounted the elastic brake-ring C, which insures that all parts of said brake-ring will be properly supported relatively to the fixed brake member E, and that therefore when expanded it will properly engage said fixed brake member at substantially all points, a feature which is of great importance in my invention. The sleeve A is preferably provided with a flange $a$.

Between the lug $a^\times$ and the flange $a$ is formed a space, as clearly shown in Fig. 6, within which is received the web or flange $b$ of the wheel-driving element B, said wheel-driving element being shown as a sprocket-wheel having a suitable number of radially-projecting teeth, which are adapted to be engaged by a sprocket-chain, as usual in safety-bicycles.

The wheel-driving element B is placed upon the sleeve A against the flange $a$, it being loosely mounted thereon in order that it may have a limited backward and forward movement, as will be described. In the web $b$ of the wheel-driving element B is formed a recess $b'$, whereby said wheel-driving element is enabled to be passed over the lug $a^\times$ when placing it in position upon the sleeve A, and into which fits a projection $c^6$, formed on one end $c$ of the brake-ring C, whereby said wheel-driving element and the end $c$ of the brake-ring C are connected together.

The brake-ring C is mounted upon the sleeve A in such manner that the ends $c$ and $c'$ thereof butt or bear against the opposite sides of the lug $a^\times$ and the end $c$ butting the lug upon its rear side, as shown in Fig. 3, whereby a forward motion of the wheel-driving element B will cause said end $c$ to rotate the hub and wheel.

In order to hold the brake-ring C and the wheel-driving element B in position upon the sleeve A, I provide a sleeve A', which has an interiorly-threaded portion $a^9$, arranged to engage a threaded projection $x^2$ upon the hub X, the threads $a^9$ being formed in an opposite direction to the threads on the sleeve A, whereby the sleeve A' constitutes a lock for the sleeve A. Upon the sleeve A' is formed a flange $a'$, which, in connection with the flange $a$ on the sleeve A, forms a groove or channel for the reception of the brake-ring C and the wheel-driving element B.

E represents the fixed brake member, which is in the form of a drum, which surrounds the brake-ring C outside of the wheel-driving element B in position to have its inner face engaged by said brake-ring C when the same shall be expanded, as hereinafter explained.

The fixed brake member E is fixedly secured in position by placing it upon the end of the axle Y within the fork Z, and it preferably has an arm or extension E', which is rigidly secured in any suitable manner to the side of the fork Z, whereby it is enabled to withstand the great strain put upon it when the brake-ring C is forced into contact therewith.

A method of securing the arm E' to the fork Z is shown in Figs. 1 and 2, where the arm E' is provided with forks or arms to embrace the fork Z of the frame, and thus prevented from turning.

In Fig. 7 the parts are shown combined ready for operation, with the exception of the drum or fixed brake member and the set-nut A'. The sprocket has been slipped on over the sleeve, the recess $b'$ passing over the lug $a^\times$. The brake-ring C is then sprung onto the sleeve, the projection $c^6$ entering into the recess $b'$ in the web of the sprocket. The construction otherwise, as illustrated in Fig. 7, will be readily understood from the description heretofore given.

In order to increase the friction between the brake-ring C and the brake-drum E, the inner surface of said brake-drum may be provided with a lining of leather or other suitable material $e$. Y' represents the usual nut screwed upon the end of the axle Y, whereby the parts are held in place within the fork Z. In chain-driven bicycles, such as shown in the drawings, the chain passes from the sprocket-wheel B to a sprocket-wheel mounted upon the crank-axle, and a revolution of the crank-axle by the pedals will cause said chain to rotate the sprocket-wheel B, rotating the hub X and wheel thereon, thus propelling the bicycle.

The operation of my invention is as follows: The parts being arranged as shown in the drawings, upon a revolution of the crank-shaft by the pedals (which are not shown) to the left the sprocket-wheel B will be rotated to the left, as shown in Fig. 1. The rotation of the sprocket-wheel in this direction will cause the end $c$ of the brake-ring C, by reason of its being connected with the sprocket-wheel by the projection $c^6$, to engage the lug $a^\times$, carried by the hub X, and rotate said hub and wheel, imparting a forward motion to the bicycle. So long as the power applied to the sprocket-wheel B is in a direction to cause its rotation to rotate the hub X in a forward direction the brake-ring C will remain out of contact with the fixed brake member E and will turn freely with the hub X. When it is desired to bring the brake-ring C into operative contact with the fixed brake member E to retard the motion of the bicycle, the rider performs the act of "back-pedaling," and this act of back-pedaling he would naturally perform if there were no brake present. This act of back-pedaling tends to retard the sprocket-wheel B or to impart thereto a movement opposite to the direction of rotation of the hub X. This action will, inasmuch as the end $c$ of the brake-ring C is connected to the sprocket-wheel B, retard said brake-ring, and the end $c'$ being in contact with the lug $a^\times$ the lug $a^\times$ will tend to force the end $c'$ away from the end $c$, thus expanding the brake-ring C, and bring its outer face into frictional engagement with the fixed brake-drum E, thus braking and retarding the forward motion of the bicycle.

It will be noted that a brake constructed according to my invention is a complete component and can be attached to most machines already constructed by unscrewing the sprocket-wheel or wheel-driving element from the hub of the driving-wheel and fixing the ring or sleeve carrying the brake and driving mechanism thereon instead and by fixing the fixed brake member to the frame of the machine concentric with the axle of the driving-wheel.

It will be further noted that in my improved brake there is a bed or support for the elastic brake-ring which acts to maintain it in a central position and to cause it to properly perform its function by gripping the internal face of the fixed brake member evenly substantially over its entire circumference, whereas in previous constructions the elastic brake-ring is not supported internally, and therefore has nothing to keep it in central position relatively to the fixed brake member whereby it can act effectually.

While I have specifically described with considerable minuteness my invention with reference to the accompanying drawings, wherein the brake is shown applied to the rear wheel of the bicycle, I desire to state that I do not in any sense consider my invention as limited to such application, and I desire, further, to state that I do not consider my invention as limited to the details of construction shown and described.

I claim—

1. In a bicycle-brake, the combination with a wheel-hub, of a fixed lug or projection carried by said hub, a split brake-ring mounted on said hub and having its ends butting against opposite sides of said lug or projection, a wheel-driving element loosely mounted on the hub and connected with one end of said brake-ring, and a fixed brake member with which said brake-ring is brought into engagement by means of said connection, substantially as described.

2. In a bicycle-brake, the combination with a wheel-hub of a bed or support secured to said hub, a split brake-ring mounted upon said bed or support, the opposite ends of said brake-ring being in operative connection with the bed or support, a fixed brake member concentric with the bed or support, and means to cause a relative rotation of the brake-ring and the bed or support to effect the engagement of the brake-ring and the fixed brake member, substantially as described.

3. In a bicycle-brake, the combination with a hub or support, of a sleeve carrying a lug secured to said hub or support and arranged to rotate therewith, a split brake-ring mounted upon and supported by said sleeve and butting against the opposite sides of said lug, a fixed brake member, and means to cause a relative rotation of the sleeve and brake-ring to effect the engagement of the brake-ring and fixed brake member, substantially as described.

4. A vehicle-brake, comprising in its construction the following elements; a sleeve with a flange projecting from its inner edge fitted to the hub of the wheel and provided with a lug or projection upon its circumference, a sprocket-wheel fitted loosely to said sleeve between said lug and flange, and an elastic brake-ring on the outer end of the hub, with separated ends, mounted upon said sleeve as a bed, the lug lying between said ends and said ends butting against said lug, one of said ends being in connection with the web of the sprocket-wheel, and an internal brake-drum concentric with said sleeve and fixedly attached to the frame of the vehicle to prevent it from turning, substantially as described.

5. A vehicle-brake, comprising in its construction a sleeve with a flange projecting from its inner edge fitted to the hub of the wheel and provided with a lug or projection upon its circumference, a sprocket-wheel fitted loosely to said sleeve between said lug and flange, an elastic brake-ring with separated ends mounted upon said sleeve as a bed, the ends of which butt against said lug, one of said ends being in connection with the web of the sprocket-wheel, a second sleeve fitted to said hub with a flange upon its outside edge, and an internal brake-drum concentric with said sleeve and fixedly attached to the frame of the vehicle to prevent it from turning, substantially as described.

6. In a bicycle, the combination with the driving-wheel, of the sleeve A screwed onto one end of the hub of the said wheel and having a circumferential flange $a$ and a transverse projection $a^\times$ on its periphery, of the sleeve A' screwed onto the end of the hub of the driving-wheel and acting as a lock-nut to the sleeve A and having the flange $a'$ on its periphery, of the sprocket-wheel B mounted loosely on the sleeve A and having the transverse slot $b'$ through its web $b$, of the elastic ring or strap C mounted on the sleeve A with its one end $c'$ bearing against the transverse projection $a^\times$ thereon and having a projection $c^6$ on its other end to engage with the slot $b'$ in the web $b$ of the sprocket-wheel, and of the internal brake-drum E surrounding the sleeve A carrying the elastic ring or strap C and fixed to the axle of the driving-wheel and to the frame of the machine so that it has no rotative movement, all combined, arranged, and adapted to operate in the manner and for the purpose set forth.

R. S. ANDERSON.

Witnesses:
 THOS. A. ROWAN,
 EDITH LACKIE.